E. F. MARTINET

SUCTION CLEANING APPARATUS

July 19, 1932. Re. 18,538

Original Filed June 15, 1927

Inventor:
Eugene F. Martinet by Albert Eugene Ausenco
Attorney.

Reissued July 19, 1932

Re. 18,538

UNITED STATES PATENT OFFICE

EUGENE F. MARTINET, OF CLEVELAND, OHIO, ASSIGNOR TO THE P. A. GEIER COMPANY, OF CLEVELAND, OHIO, A CORPORATION OF OHIO

SUCTION CLEANING APPARATUS

Original No. 1,753,799, dated April 8, 1930, Serial No. 198,957, filed June 15, 1927. Application for reissue filed April 7, 1932. Serial No. 603,905.

My invention relates to improvements in suction cleaning apparatus, and more particularly, to the suction cleaning nozzle and its associated removable and adjustable brush attachment adapted to be actuated into a plurality of operative positions or out of operative relation within the nozzle. The object of my invention is to provide a readily renewable brush attachment, preferably interiorly of a suitably shaped nozzle, which will be adapted for all of the various requirements made upon a suction cleaning tool of this class.

In Letters Patent to Robertson, No. 1,382,548, June 21, 1921, there is shown and described a retractible brush member positioned rearwardly of a suction cleaner nozzle, which is adapted to be actuated into spring-pressed, floating relation with respect to the surface that is being cleaned; the brush being incapable of ready removal and replacement.

The present improvement contemplates further features of advantage and invention, comprising a readily removable and replaceable brush member disposed interiorly of the suitably recessed nozzle, which brush is provided with three distinct positions, affording operative and inoperative relation respecting the associated nozzle. Thus, in addition to affording a completely retracted and floating position, respectively for my improved brush member, a third or fully-extended and locked position is afforded for the brush, which, moreover, may be readily removed for cleaning or replacement, as may be found necessary.

It has been found in practice that while the floating, spring-pressed relation of the brush commonly is required for cleaning rugs and floor coverings, a rigidly attached and fully extended brush member often is more effective for heavier cleaning operations, and particularly for cleaning adjacent bare floors bordering the rugs, without readjustment of the height of the suction cleaning nozzle. These requirements all are admirably met by my improved construction, the details of which may best be explained in connection with the accompanying drawing, wherein.

Throughout the several figures of the drawing I have employed the same character of reference to indicate similar parts.

Figure 3:
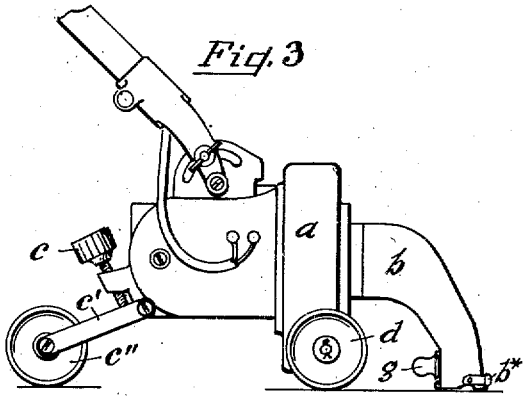
Fig. 3 is a view of the entire suction cleaner and nozzle with brush attachment in side view.

Referring initially to Fig. 3, showing a portable suction cleaner *a* having a nozzle tool *b* forwardly positioned thereon and equipped with my instant improvements, it will be seen that the relative height of the elongated suction mouth nozzle opening may be regulated by the screw *c* acting upon the pivoted bracket *c'* of the rear supporting wheel *c''*. By this adjustment the entire suction cleaner and nozzle may be rocked on the axis of the front wheels *d*. This serves, in turn, to regulate the height of the nozzle opening with respect to the floor or cleaned surface.

Figure 1:
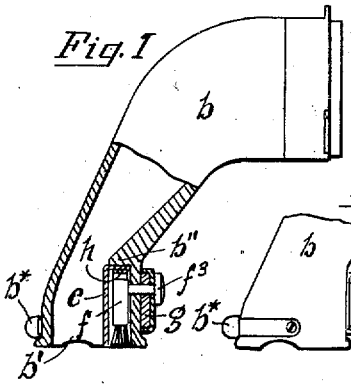
Figure 1 is a view of a suction cleaning nozzle in side elevation, but partially broken away and in section, to which my improvements are applied.
Figure 2:
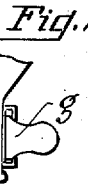
Fig. 2 is a complementary fragment in side or end view.
Figure 4:
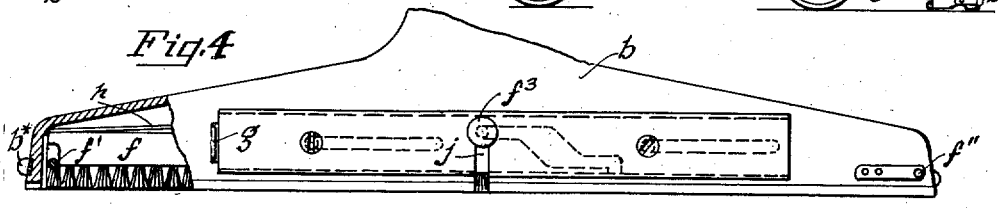
Fig. 4 is a rear view of the suction cleaner nozzle upon a materially larger scale, partially broken away and in section, showing the brush in its retracted position.

As best shown in Figs. 1 and 4, the brush attachment is positioned interiorly and at the rear of the nozzle opening *b'* within a longitudinal recess formed by an integral shoulder *b''* as a part of the nozzle casting. This shoulder, in connection with the longitudinal L-shaped mounting strip *e*, affords an effective air passage avoiding the formation of eddy currents, with certain settling out of the dust and refuse. Exteriorly of the nozzle is a soft rubber bumper *b** terminally attached at its ends to the ends of the nozzle casting.

Figure 5:
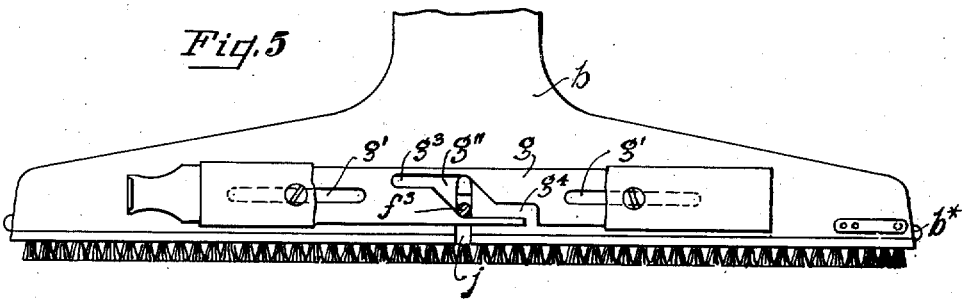
Fig. 5 is a similar view illustrating the adjustment of the cam plate to insure the floating relation of the brush.

The removable brush member *f* is retained normally in position by means of the stud or detent $f'$ engaging one end, and the spring-pressed stud or detent $f''$ normally, but removably engaging the other end when the brush is released by the cam plate. This cam plate, as shown in full and dotted lines in its three controlling positions, serves to regulate the operative condition of the brush member. As shown in Fig. 5, the cam plate $g$ has two longitudinal slots $g'$ and an intermediate three-position slot $g''$ with respect to stud or operating member $f^3$ extending therethrough rearwardly of the brush. When the cam plate is in the position indicated in Fig. 4, said stud is engaged by the upper branch $g^3$ of irregular slot $g''$ and the brush is maintained locked in its fully retracted position against the tension of bowed spring $h$. This maintains the brush in inoperative relation with respect to the nozzle for ordinary air cleaning operation.

Upon partially withdrawing the cam plate toward the left, however, as indicated in Fig. 5, the stud $f^3$ is released within the open intermediate portion of the slot $g''$, thus permitting the brush a free or floating relation within the nozzle, against the tension of its spring, to co-operate with the cleaning action of the air currents generated by the suction cleaner. Preferably the height of the nozzle opening above the cleaned surface is adjusted by means of the screw $c$, and this relation of the brush is one admirably adapted for air cleaning and brushing the dirt concurrently from rugs.

Figure 6:
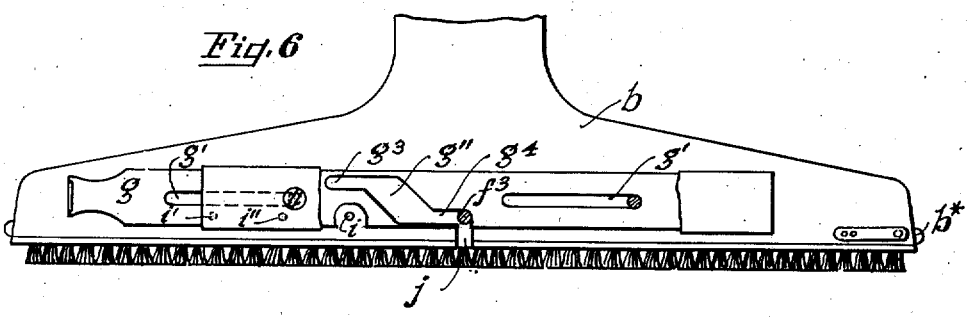
Fig. 6 is another similar view illustrating the locked and fully extended position of the brush, from which it may also be removed.

Of course, it is equally desirable to clean the adjacent bare floor and bordering edges of rugs and other floor coverings and this preferably is accomplished without readjusting the height of the nozzle opening, so that the cleaning operation may not be materially interrupted. Accordingly, the cam plate is fully withdrawn toward the left, as indicated in Fig. 6, whereupon the stud $f^3$ will be locked in the lower branch $g^4$ of slot $g''$ and the brush thereby is firmly locked in its fully extended position to compensate for the slightly lower level of the bare floor, as compared with the surface of the rug. This rigid position and relation of the brush, moreover, is more effective for certain kinds of cleaning, such as the removal of caked dirt or lint.

It will be understood that with the ready movement of the cam plate to the right either of the other positions of the brush immediately is available. In order to insure the retention of an adjusted position of the cam plate, rear recesses $i'$, $i''$ and a third recess which is shown engaged by the spring pressed ball $i$ are provided therein adapted alternatively to be engaged by the spring-pressed ball $i$ provided intermediately in the nozzle casting.

It will be observed that the lower branch $g^4$ of the slot $g''$ is open at the extreme right to register with the intermediate slot $j$ provided in the rear wall or lip of the nozzle suction mouth to accommodate the movement of the stud $f^3$ positioned in the slot $j$. This accordingly permits the ready removal of the brush for cleaning or replacement merely by releasing one end through retracting the spring-pressed stud $f''$ on the right. Otherwise, the coaction of the studs $f'$, $f''$ and $f^3$, serves to lock the brush in the extended position indicated in Fig. 6, as already described.

Although the brush member is positioned interiorly of the nozzle in fully protected relation, and without in any way impairing its efficiency in the compact relation herein provided, the slotted nozzle and actuating cam permit the immediate actuation of the brush member into any of its three alternative positions, or its removal and replacement, with as much ease as though said brush member were exteriorly placed.

Having now described apparatus embodying my invention, and the manner of its use, I claim as new and desire to secure by Letters Patent, the following:

1. The combination with a suction cleaner nozzle of the class described, of a brush member adjustably positioned adjacent the mouth of said nozzle, an actuating member connected to said brush member and extending exteriorly of said nozzle, and a plate having a cam slot, with upper and lower locking branches, engaging said actuating member and adapted to lock said actuating member in two alternative positions to fully extend or fully retract said brush member.

2. The combination with a suction cleaner nozzle of the class described, of a brush member adjustably positioned within the mouth of said nozzle, a spring normally maintaining said brush member in resilient floating relation with respect to the surface being cleaned, a brush actuating member connected to said brush member and extending exteriorly of said nozzle, and a slidable plate having a cam slot receiving said actuating member and being adapted to lock said actuating member in two alternative positions to fully extend or fully retract said brush member.

3. The combination with a vertically slotted suction cleaner nozzle of the class described, of a brush member adjustably positioned within the mouth of said nozzle, a plate slidably mounted upon said nozzle, said plate having formed therein a combined cam and locking slot, and an actuating member engaging said brush member and extending through said slots.

4. The combination with a suction cleaner nozzle of the class described, of a brush member adjustably positioned adjacent the mouth of said nozzle, a plate slidably mounted upon said nozzle, said plate having formed therein a slot comprising a divergent cam portion and an upper and lower locking portion, and an actuating member engaging said brush member, extending through said slot and adapted to be engaged in the locking portion of said slot to lock said brush member in its adjusted position.

5. The combination with a suction cleaner nozzle of the class described, of a brush member adjustably positioned adjacent the mouth of said nozzle, a plate slidably mounted upon said nozzle, said plate having formed therein a combined cam and locking slot comprising an inclined portion and oppositely extending locking portions forming oppositely disposed locking shoulders, and a brush actuating member connected to said brush member, extending through said slot and adapted to engage said locking shoulders to lock said brush member in its extended and retracted positions, respectively.

6. The combination with a vertically slotted suction cleaner nozzle of the class described, of a brush member adjustably positioned within the mouth of said nozzle, a plate slidably mounted upon said nozzle, said plate having a slot therein providing a cam face and upper and lower locking faces, and a brush actuating member connected to said brush member, extending through said slots and adapted to engage said locking faces to lock said brush member in its extended and retracted positions, respectively.

7. The combination with a suction cleaner nozzle of the class described, of a brush member mounted thereon adjacent the mouth of said nozzle, a plate slidably mounted upon said nozzle, said nozzle having a vertical slot therein, said plate having formed therein a cam slot comprising an intermediate expanded inclined portion and connected oppositely extending substantially horizontal upper and lower locking portions, forming locking faces, a brush actuating member connected to said brush member and extending through said slots and adapted to engage said locking faces to lock said brush member in its extended and retracted positions, respectively, and a spring engaging said brush member to maintain said brush member in floating relation with respect to the surface being cleaned when the actuating member is positioned in the intermediate portion of said cam slot.

8. The combination with a suction cleaning tool having an elongated suction mouth with its rear lip slotted, of a brush having a stud positioned in said slot said brush being removably positioned within the mouth, means tensioned against the brush normally to press it against the surface being cleaned, and means removably holding the brush within the suction mouth.

9. The combination with a suction cleaning tool having an elongated suction mouth with its rear lip slotted, of a brush having a stud positioned in said slot said brush being removably positioned within the mouth, and means removably holding the brush within the suction mouth.

EUGENE F. MARTINET.